(12) United States Patent
Bolinski (10) Patent No.: US 8,556,277 B1
(45) Date of Patent: Oct. 15, 2013

(54) WHEELED DEVICE TO ASSIST IN CARRYING LADDERS

(76) Inventor: Eric Calvin Bolinski, Charles City, IA (US)

( * ) Notice: Subject to any disclaimer, the term of this patent is extended or adjusted under 35 U.S.C. 154(b) by 0 days.

(21) Appl. No.: 13/480,185

(22) Filed: May 24, 2012

(51) Int. Cl.
*B62B 1/00* (2006.01)

(52) U.S. Cl.
USPC .......................... 280/47.131; 280/63

(58) Field of Classification Search
USPC ............ 280/79.6, 79.7, 47.15, 63, 767
See application file for complete search history.

(56) References Cited

U.S. PATENT DOCUMENTS

| | | | | |
|---|---|---|---|---|
| 3,612,218 | A * | 10/1971 | Blair et al. | 182/127 |
| 3,991,852 | A * | 11/1976 | Brookes et al. | 182/169 |
| 4,009,762 | A * | 3/1977 | Bjerkgard | 182/20 |
| 4,049,283 | A * | 9/1977 | Brookes et al. | 280/47.131 |
| 4,392,665 | A * | 7/1983 | Miller et al. | 280/414.2 |
| 5,205,571 | A * | 4/1993 | Geier et al. | 280/47.35 |
| 5,427,356 | A * | 6/1995 | Krotov et al. | 254/324 |
| 5,882,023 | A * | 3/1999 | Swager | 280/47.131 |
| 6,209,681 | B1 * | 4/2001 | DiSario | 182/20 |
| 7,484,594 | B1 * | 2/2009 | Feliciano et al. | 182/127 |
| 7,849,961 | B1 * | 12/2010 | Feliciano et al. | 182/20 |
| 2002/0089135 | A1 * | 7/2002 | Feik | 280/63 |
| 2002/0117821 | A1 * | 8/2002 | Abraham et al. | 280/79.7 |

* cited by examiner

*Primary Examiner* — J. Allen Shriver, II
*Assistant Examiner* — Travis Coolman (57) ABSTRACT

A wheeled dolly for a ladder that connects to two adjacent rungs by means of hooks in the front that hook over one rung and a pincer action in the back actuated by the angle of the wheel assembly and the downward pressure exerted on the dolly by the weight of the ladder. Once engaged the ladder may easily be pulled or pushed with most of the weight resting on the dolly.

8 Claims, 10 Drawing Sheets

WHEELED DEVICE TO ASSIST IN CARRYING LADDERS

CROSS REFERENCE TO RELATED APPLICATIONS

Not applicable.

BACKGROUND OF THE INVENTION

The present invention relates to a wheeled dolly that will quickly and easily attach to and detach from the rungs of many different ladders. This will facilitate the easy transport of ladders across terrain. The dolly can fold down for storage when not in use.

Various wheeled ladder caddies or dollies have been advanced for supporting ladders while transporting them, including, for example, U.S. Pat. Nos. 6,708,993 B2, and 4,049,283. What has thus far been missing from the marketplace however is a device that supports a ladder in the center, which is most advantageous for weight reduction, can attach and detach from various kinds of ladders easily, and can easily fold down for convenient storage. This is the need that my invention satisfies.

SUMMARY OF THE INVENTION

The present invention relates to a ladder dolly that consists of two primary components, a ladder cradle and a wheel assembly. These two components are connected so as to be able to pivot. The unit is narrow enough to fit between the ladder rails. The wheel assembly consists of two upright supports, an axle and two wheels spaced far enough out from the upright supports so as not to interfere with the dolly being able to fold. The cradle is designed with hooks on one end that attach from beneath the ladder to one ladder rung and a curve on the opposite end to come up behind an adjacent rung. The upright supports of the wheel assembly extend above the pivot points in such a way that when the wheel assembly is pushed in one direction the rung on the non-hooked end of the cradle will be clamped securely. When the wheel assembly is pushed in the opposite direction, the rung is released and the cradle can be easily detached from the ladder. When attached to a ladder, the wheel assembly sits at an angle, which causes the weight of the ladder to maintain the clamping pressure on the non-hooked rung. When no rung is clamped between the upright supports and the cradle, the dolly will naturally fold down to a size only slightly larger than the cradle section. The dolly may be attached in many locations on the ladder, however the greatest benefit will come from attaching it near the center. The dolly is designed so that the operator should stand at the end of the ladder with the hooks of the cradle directed toward him, however it should be noted that this design could also function if used backward.

DETAILED DESCRIPTION OF THE PREFERRED EMBODIMENTS

Figure 1:
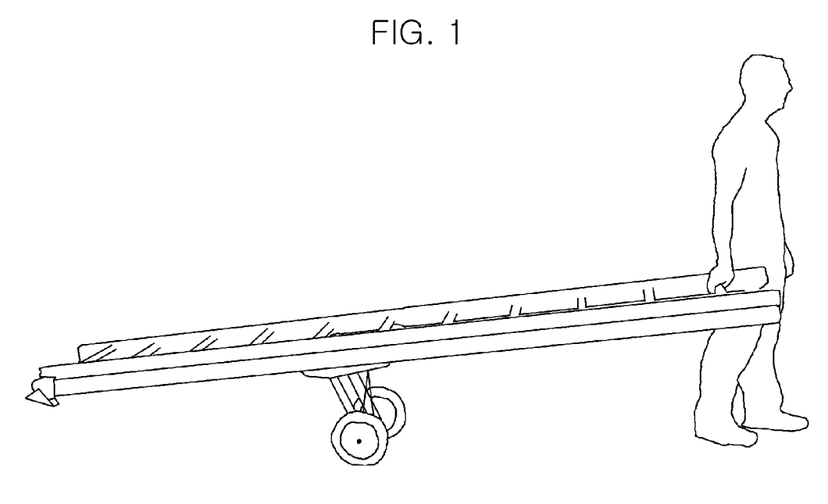
FIG. 1 shows how this device could be used once attached to a ladder.
Figure 2:
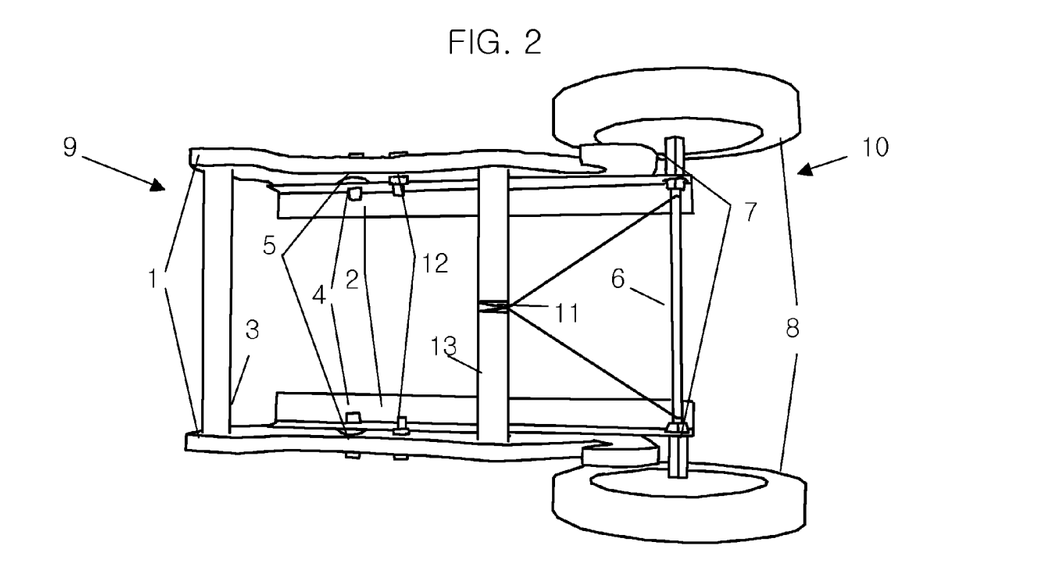
FIG. 2 is a top view of the device when folded showing every numbered part.
Figure 3:
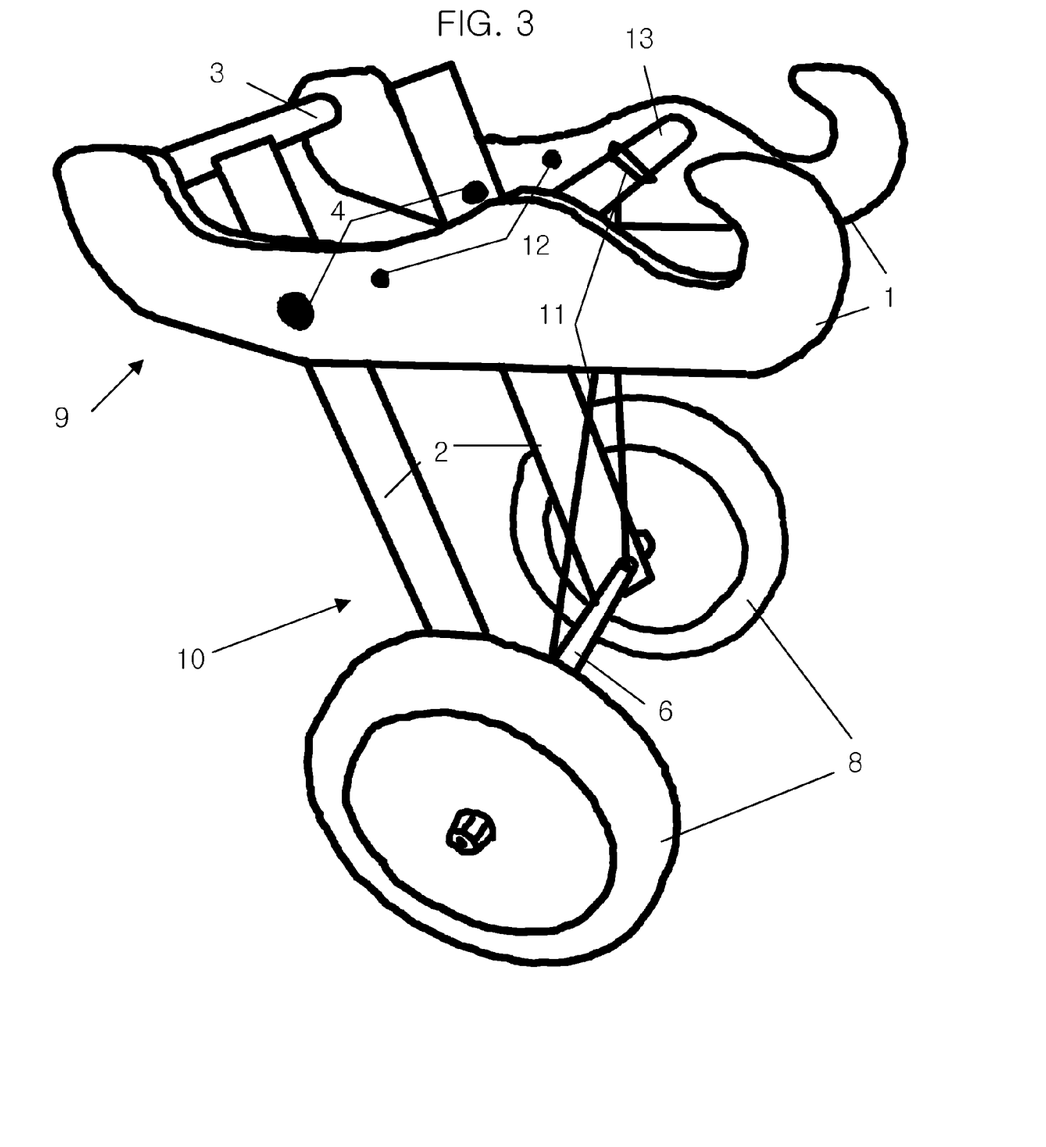
FIG. 3 shows the dolly with the wheel assembly pivoted as it would be when attached to a ladder.
Figure 4:
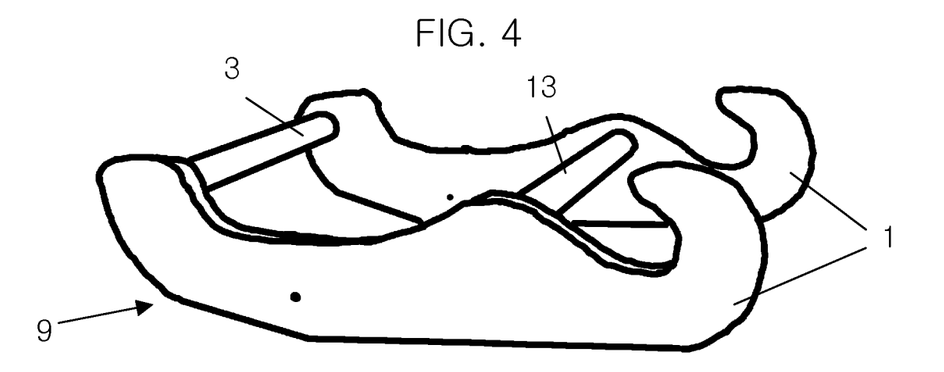
FIG. 4 shows the cradle only.
Figure 5:
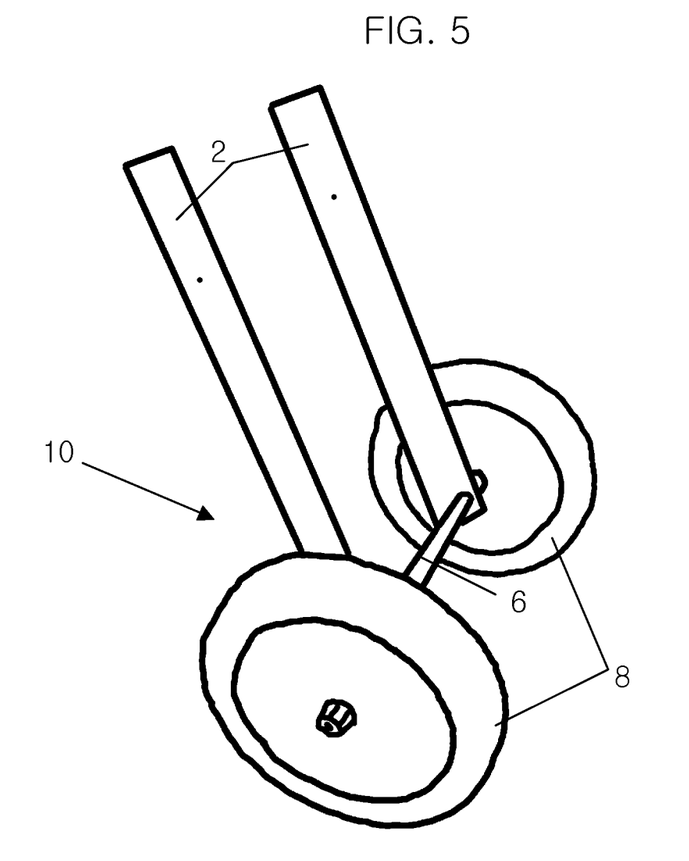
FIG. 5 shows the wheel assembly only.
Figure 6:
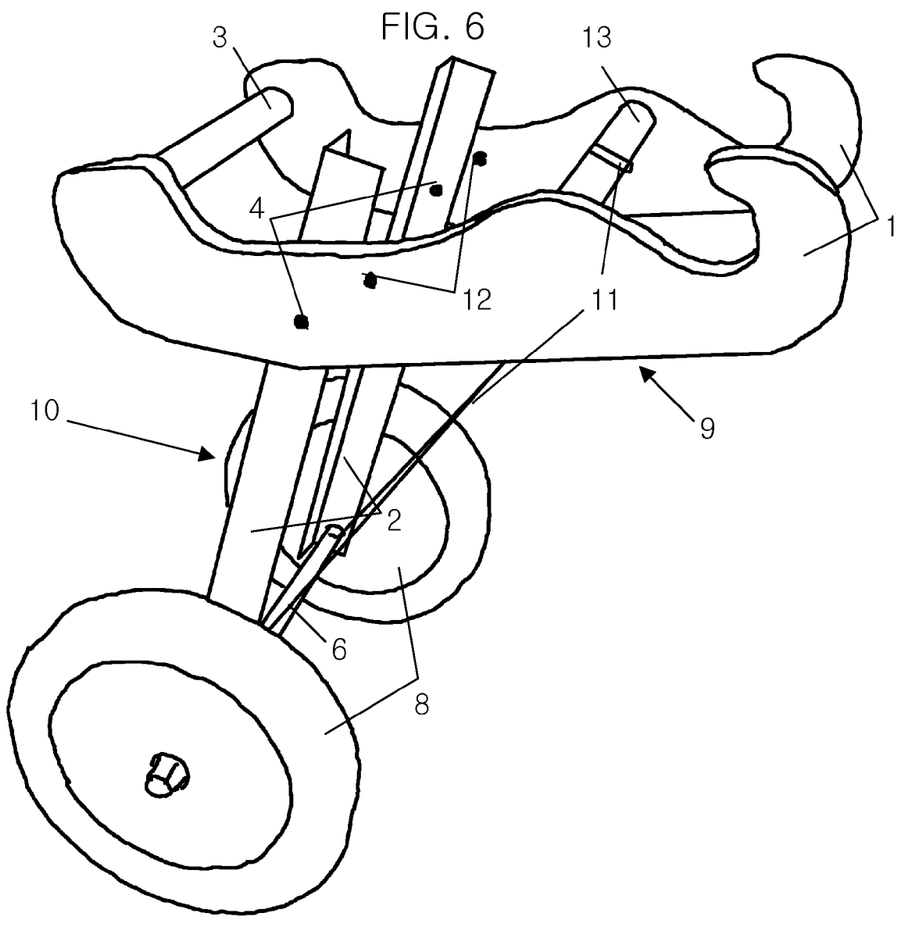
FIG. 6 shows the dolly with the wheel assembly pivoted to release the ladder.
Figure 7:
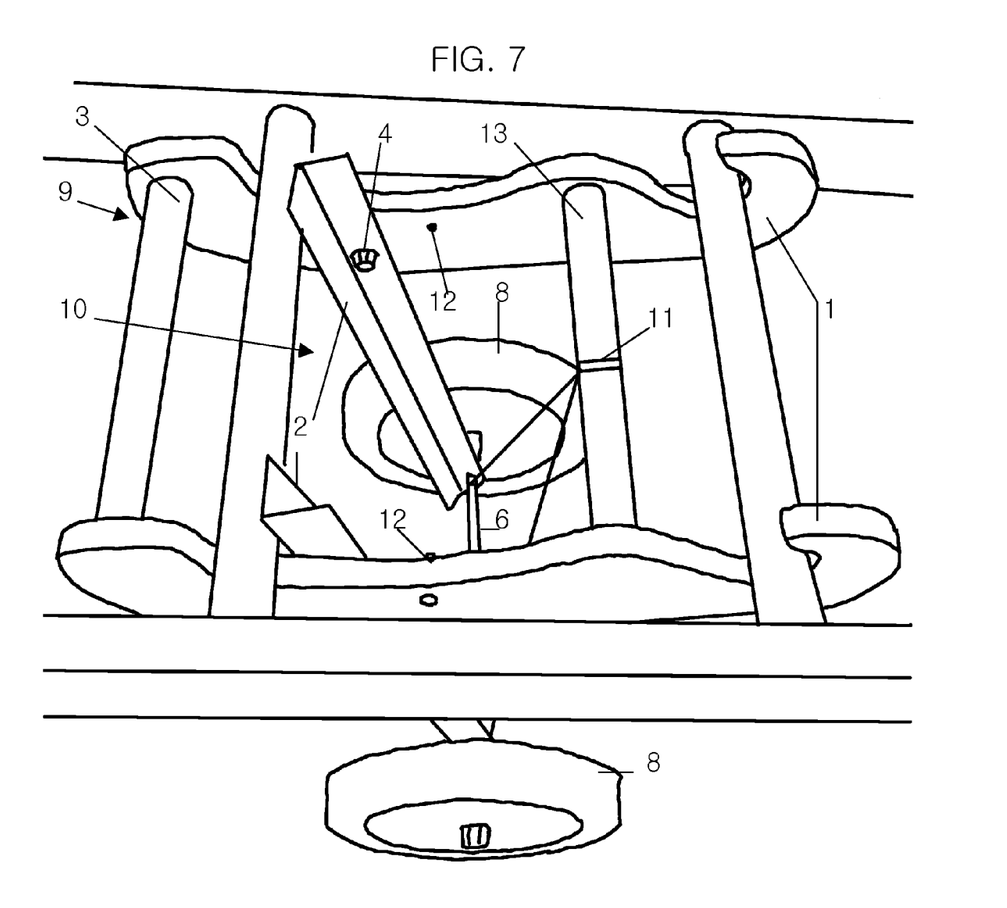
FIG. 7 is a top view of the dolly attached to a ladder.
Figure 8:
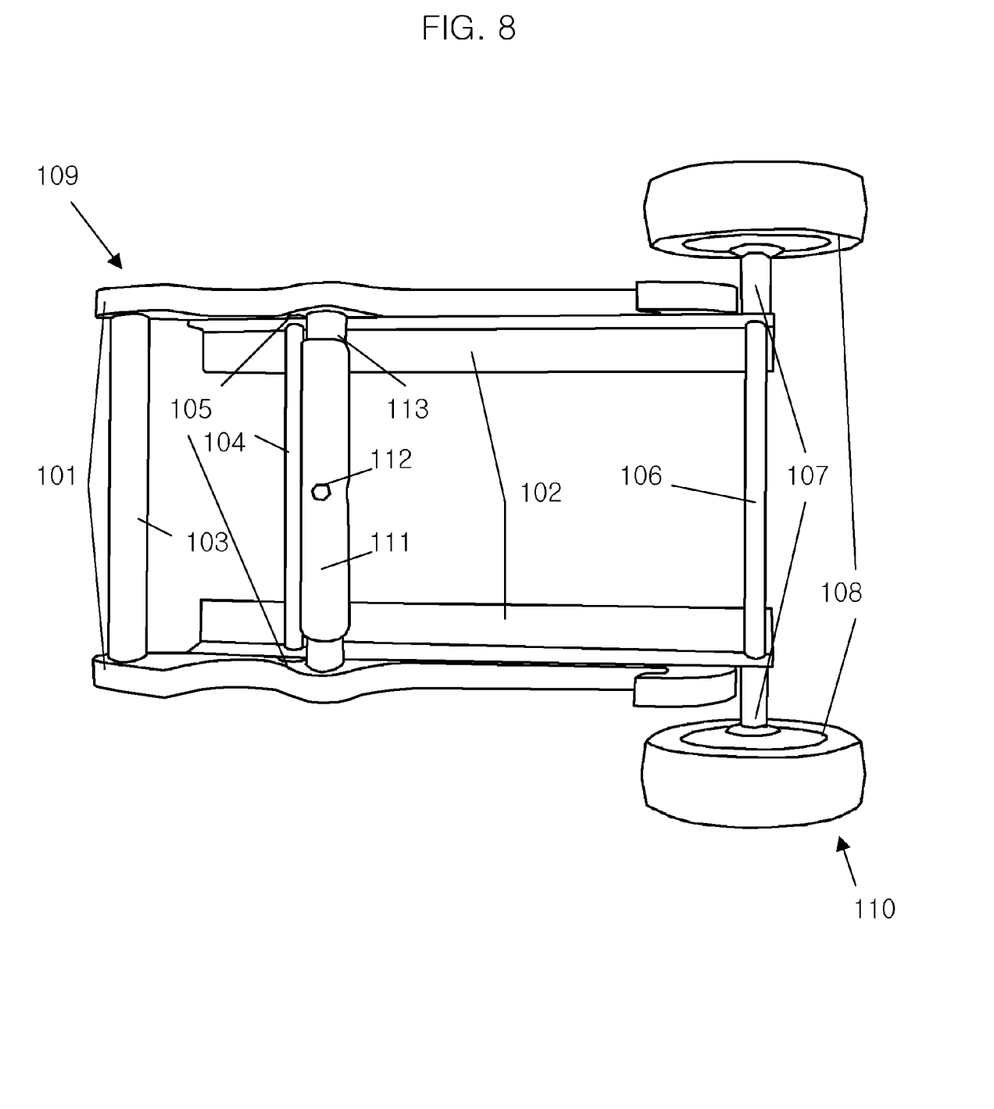
FIG. 8 is a top view of a second embodiment of the device in the folded position.
Figure 9:
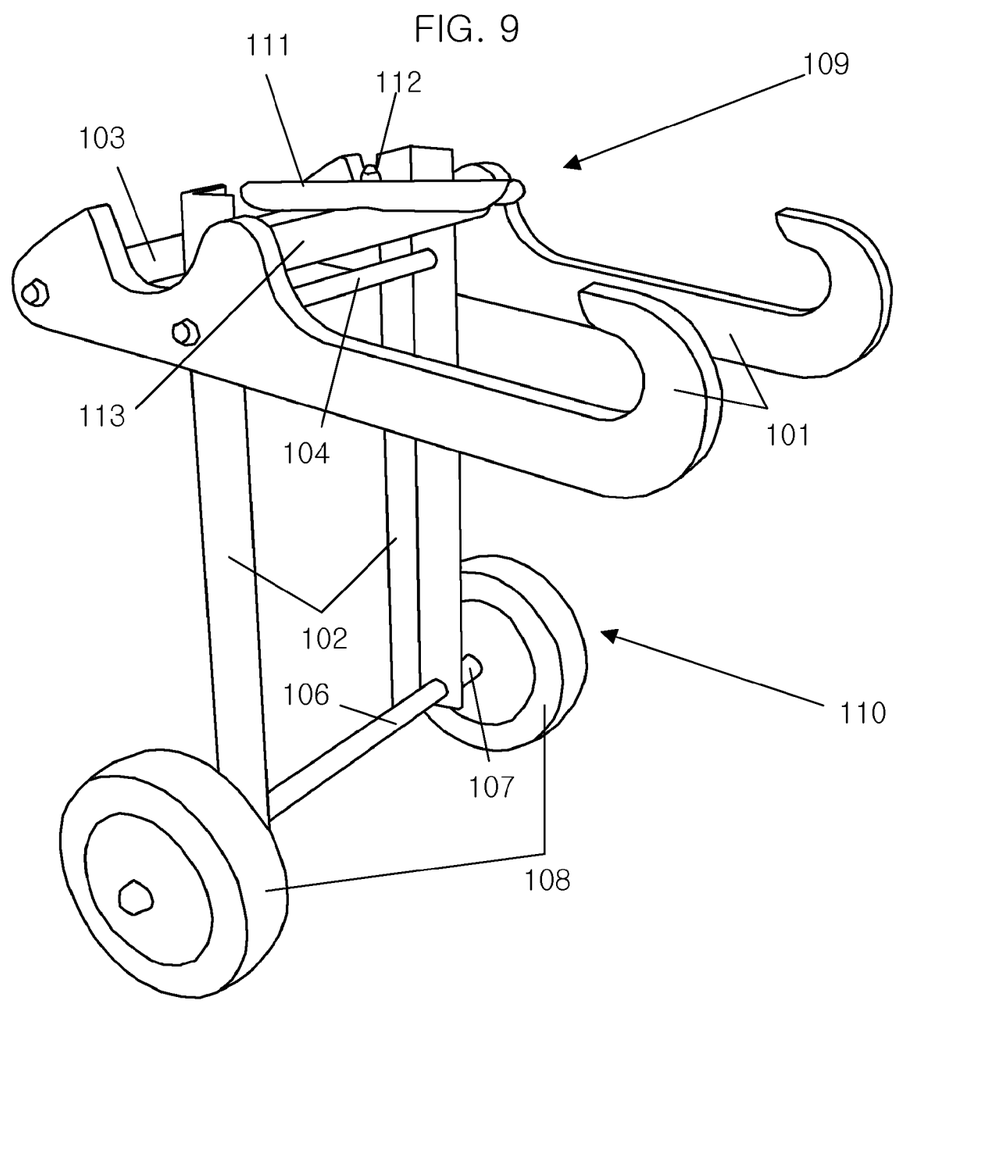
FIG. 9 shows the second embodiment of the device in the upright position.

A dolly made according to the present invention has a cradle 9 including two sides 1 and two rods 3 and 13 connecting them. It also has a wheel assembly 10 that includes two upright supports connected by an axle 6. The axle 6 has spacers 7 on each end to ensure that the wheels 8 do not run into the cradle 9 when the unit is folded. The cradle 9 and the wheel assembly 10 are connected by nuts and bolts, rivets, or other fasteners 4 that permit the cradle 9 and wheel assembly 10 to pivot in relation to each other. A plate or washer 5 goes between the cradle 9 and wheel assembly 10 at the pivot points 4 to reduce friction. Bungee cords, shock cord, or springs 11 are connected between one of the rods 13 and the axle. These, while not critical to the function of the device, help to ensure that the wheels are properly positioned during use. A nut and bolt or other hardware 12 is installed in the cradle 9 in such a way as to prevent the wheel assembly 10 from pivoting excessively into the unclamped position. When the wheel assembly 10 is pivoted back as depicted in FIG. 6 the cradle 9 can be hooked to one rung and have the back of it pulled up snugly against an adjacent rung. Then by pivoting the wheel assembly 10 forward as depicted in FIG. 3 the tops of the upright supports 2 secure the back rung against the cradle 9 with a pincer action. By allowing the weight of the ladder to rest on the dolly in this position the ladder is securely attached to the dolly as depicted in FIG. 7 and can be easily pulled around as depicted in FIG. 1 or pushed.

Figure 10:
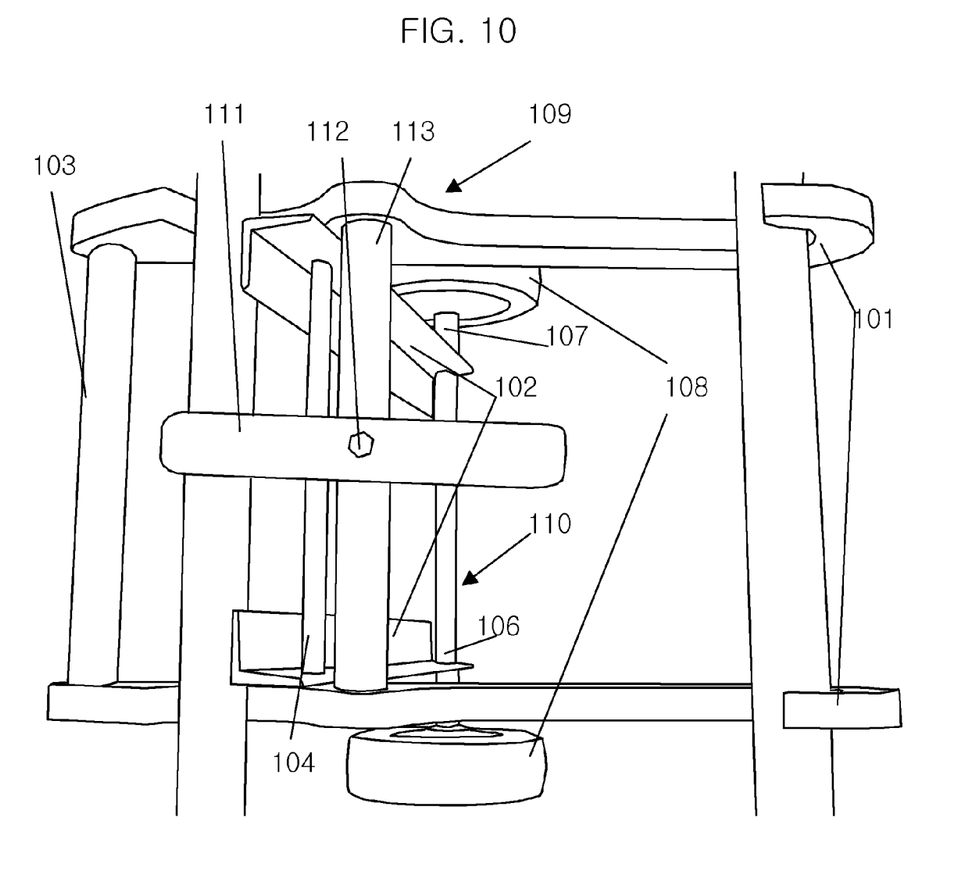
FIG. 10 is a top view of the second embodiment attached to a ladder.
Figure 11:
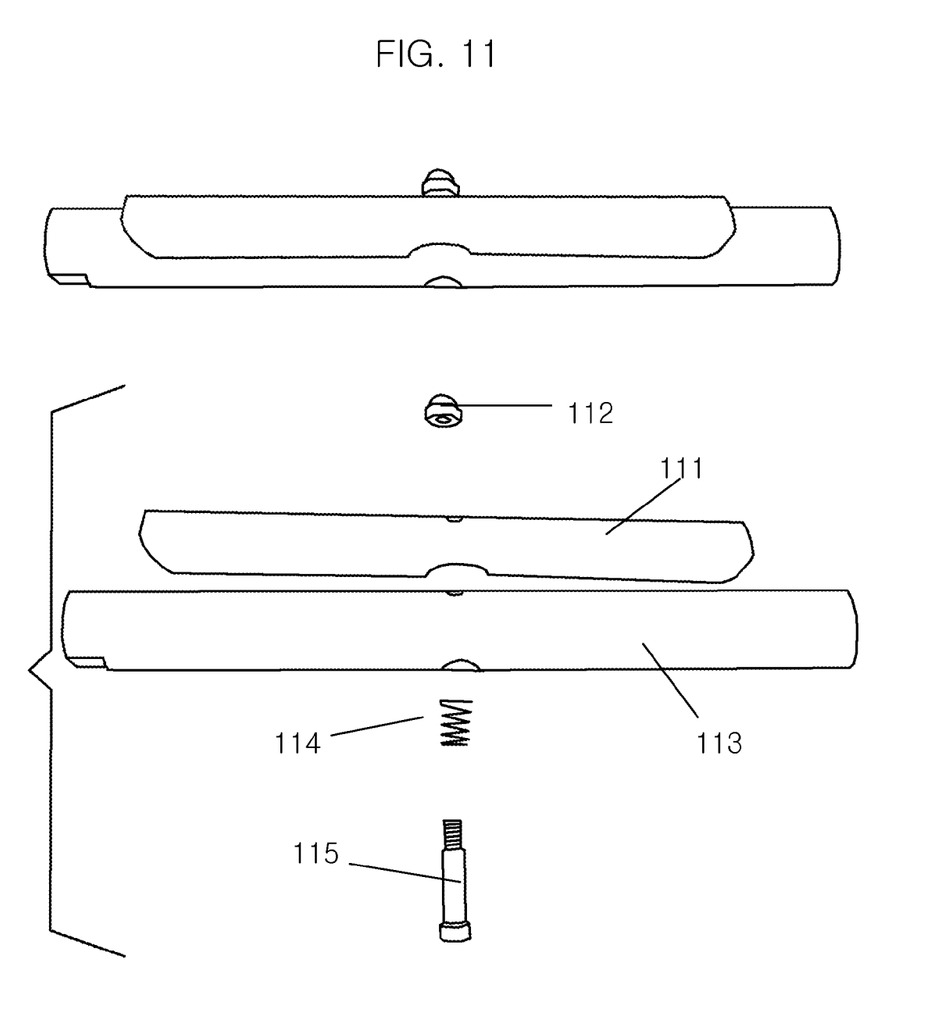
FIG. 11 shows one handle with the clip assembly of the second embodiment.
Figure 12:
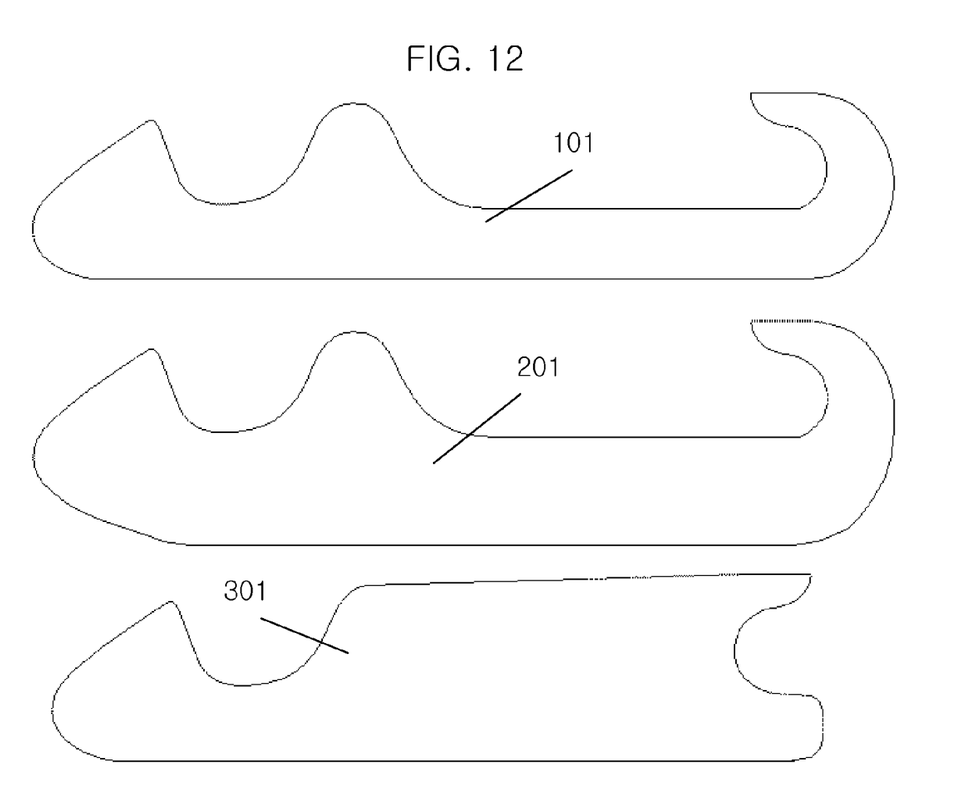
FIG. 12 shows the cradle side of the second embodiment along with a cradle side for a heavier duty third embodiment and a cradle side for a fourth embodiment showing the hook direction reversed.

The second embodiment of the present invention has a cradle 109 including two sides 101 and two handles 103 and 113 connecting them along with a pivot shaft 104. It also has a wheel assembly 110 that includes two upright supports connected by an axle 106 and the pivot shaft 104. The axle 106 has spacers 107 on each end to ensure that the wheels 108 do not run into the cradle 109 when the unit is folded. The cradle 109 and the wheel assembly 110 are connected by the pivot shaft or other fasteners 104 that permit the cradle 109 and wheel assembly 110 to pivot in relation to each other. A plate or washer 105 goes between the cradle 109 and wheel assembly 110 where the pivot shaft 104 connects them to reduce friction. Instead of bungee cord, shock cord, or springs 11, the second embodiment uses a clip 111 to allow the device to be secured to a ladder even when no weight is resting on it. Other clip, strap or clamping devices could also be used for this purpose. The clip 111 is designed to fold out of the way when not in use. The clip may be attached to the handle 113 by use of a nut 112 and bolt 115 or other hardware along with a spring 114 which spring permits the clip to snap into the engaged position or the folded position. One handle 113 is positioned in such a way as to prevent the wheel assembly 110 from pivoting excessively into the unclamped position. When the wheel assembly 110 is pivoted back, the cradle 109 can be hooked to one rung and have the back of it pulled up snugly against an adjacent rung. Then by pivoting the wheel assembly 110 forward the tops of the upright supports 102 secure the back rung against the cradle 109 with a pincer action. This also prevents the wheel assembly 110 from folding when the device is attached to a ladder. By allowing the weight of the ladder to rest on the dolly in this position the ladder is securely attached to the dolly as depicted in FIG. 10 and can be easily pulled around as depicted in FIG. 1 or pushed. This device can securely attach to a wide variety of ladder rung styles. It can also be attached to step ladders by engaging the hooks in the bottom side of a step. Many variations to the cradle shape could be made as can be seen from comparing 1, 101, 201 and 301.

Although the present invention has been described with reference to preferred embodiments, workers skilled in the art will recognize that changes may be made in form and detail without departing from the spirit and scope of the invention.

What is claimed is:

1. An apparatus for removably attaching a ladder to a dolly or sled is configured to attach to two rungs or steps of said ladder, wherein the ladder and the apparatus are effectively prohibited from movement relative to each other once the dolly or sled is resting on a surface without the need to manually engage any securing or clamping mechanism.

2. An apparatus for attaching a ladder to a dolly or sled comprising a cradle configured such that placing two of the ladder's steps or rungs in the cradle while the dolly or sled is in an unfolded state causes the dolly or sled to remain unfolded, thereby enabling the dolly or sled to carry the ladder above the ground.

3. An apparatus for attaching a ladder to a dolly or sled comprising a cradle with hooks at one end for attaching to a first rung of the ladder and one or more pivoting levers, wherein the one or more pivoting levers automatically clamp a second rung of the ladder to a part of the cradle at a distance from said hooks when a portion of the weight of the ladder is placed on the apparatus while said first rung and said second rung are in a position to be engaged by the cradle.

4. The apparatus of claim 3, wherein the absence of said rungs or steps in the cradle allows the dolly or sled to fold down for storage.

5. The apparatus of claim 3, wherein the cradle further comprises a plurality of rods, said rods are configured to serve as handles for carrying and using said apparatus.

6. The apparatus of claim 3 further configured such that the apparatus can be easily transferred from one ladder to another, and is capable of being securely attached to each of two stepladder steps, round rungs and D shaped rungs.

7. The apparatus of claim 3 further comprising a wheel or wheels rotationally mounted to an end of the lever or levers opposite the cradle in such a way that said lever or levers act as wheel supports.

8. The apparatus of claim 3 is configured such that when the second rung of the ladder is being clamped by the one or more pivoting levers, the pivoting levers are prevented from folding and are thereby held in a position to support the ladder upon the apparatus, and wherein the absence of said second rung being clamped will permit the apparatus to fold down for storage.

* * * * *